United States Patent [19]
Billi et al.

[11] 3,868,009
[45] Feb. 25, 1975

[54] TRANSFERRING DEVICE
[75] Inventors: Agostino Billi; Angelo Palmieri, both of Bologna, Italy
[73] Assignee: Carle & Montanari S.p.A., Milan, Italy
[22] Filed: Mar. 29, 1973
[21] Appl. No.: 345,974

[52] U.S. Cl................................. 198/25, 214/1 BC
[51] Int. Cl............................................ B65g 47/32
[58] Field of Search ............ 198/25, 210, 103, 241, 198/243, 34; 214/1 BC

[56] References Cited
UNITED STATES PATENTS
| | | | |
|---|---|---|---|
| 2,371,748 | 3/1945 | Fedorchak | 198/210 |
| 2,840,223 | 6/1958 | Schoppee | 198/34 |
| 3,101,151 | 8/1963 | Schreiber | 198/210 |
| 3,175,673 | 3/1965 | Hagner et al. | 198/25 |
| 3,175,702 | 3/1965 | Banyas | 198/25 |
| 3,472,354 | 10/1969 | Locatelli | 198/25 |

Primary Examiner—Evon C. Blunk
Assistant Examiner—Richard K. Thomson
Attorney, Agent, or Firm—Pollock, Philpitt & Vande Sande

[57] ABSTRACT

Apparatus for transferring workpieces delivered at random to a supply conveyor are transferred to a discharge conveyor to be deposited thereon in regular spaced relation by tong-like grippers which are carried by a rotatable turn-table conveyor disposed above the supply and discharge conveyors. The grippers descend to grip a workpiece arrested by a stop at the output end of the supply conveyor and when the workpieces are gripped the grippers and workpieces are raised for movement by the turn-table conveyor to a position above the discharge conveyor at which position the grippers and workpieces are lowered to deposit the workpieces on the discharge conveyor and after releasing the workpieces the grippers are again raised.

8 Claims, 10 Drawing Figures

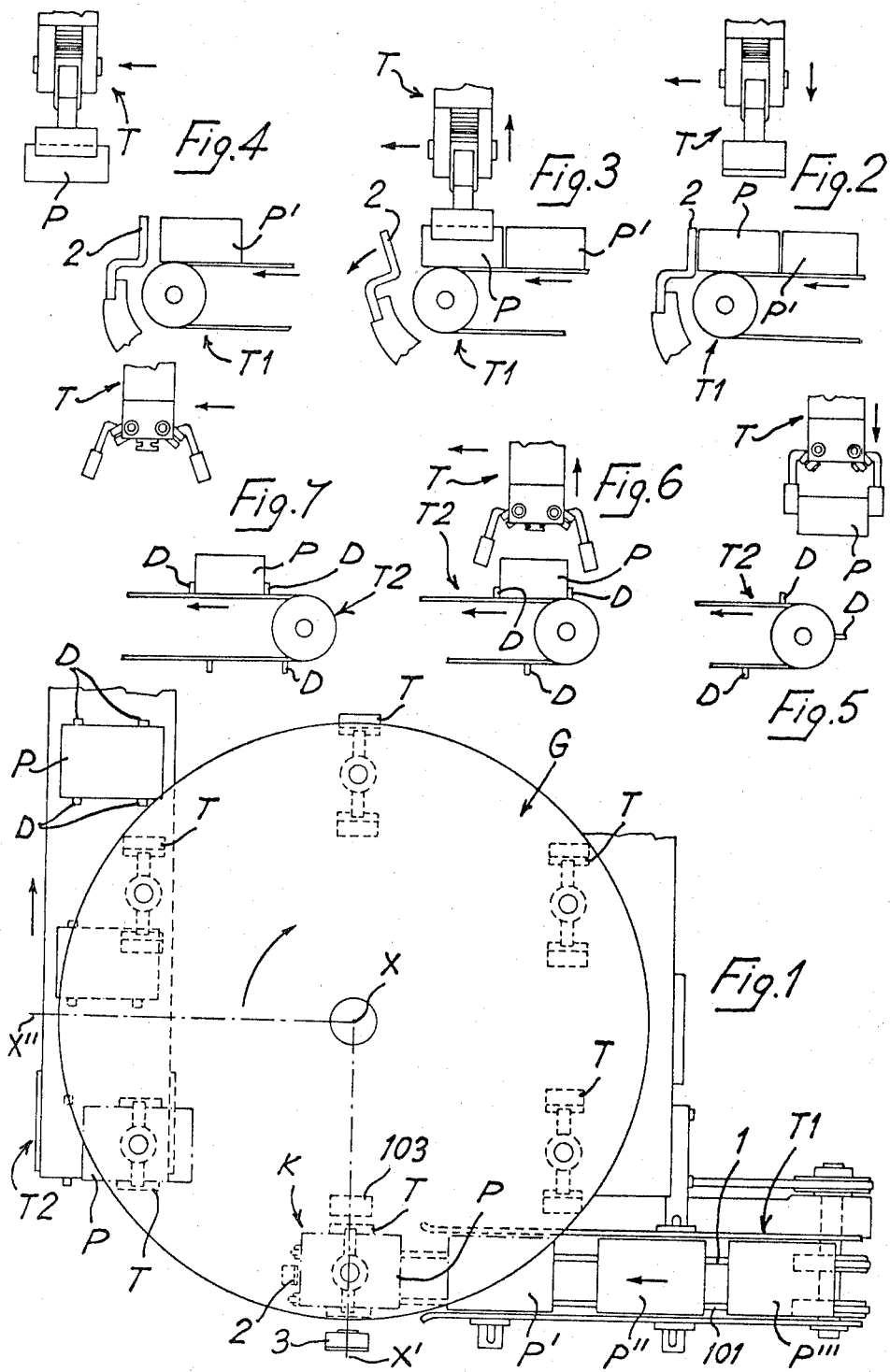

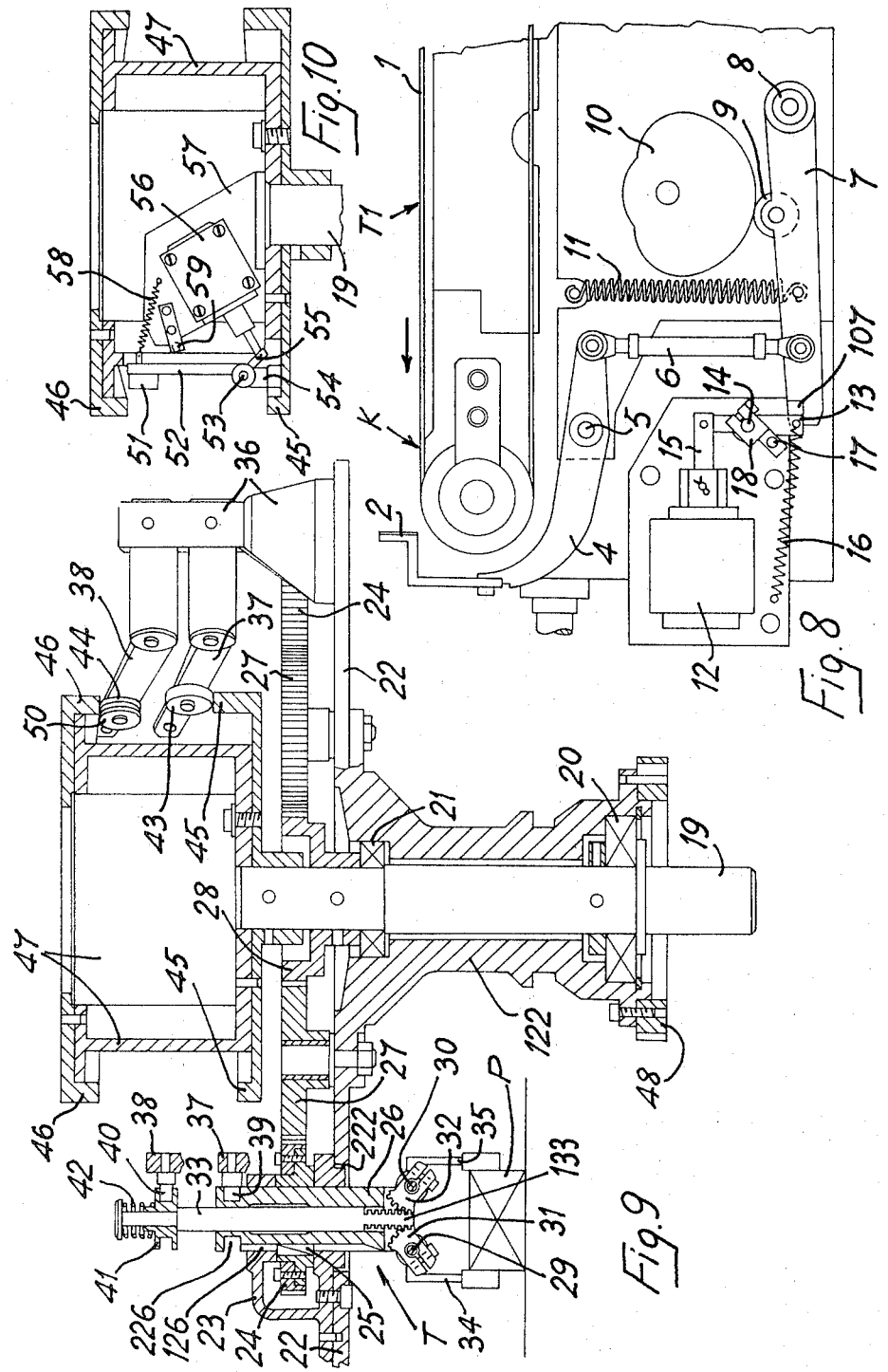

TRANSFERRING DEVICE

This invention relates to apparatus for feeding workpieces from a supply conveyor to which the workpieces are delivered at random, to a discharge conveyor, arranged to receive workpieces and move them in predetermined regular spaced relation.

It is an object of the invention to provide an apparatus of the said kind which is operationally reliable and of great adaptability to workpieces of different sizes or shapes, and which ensures that the workpieces are transferred without damage and that the predetermined alignment of the workpieces is maintained.

According to the invention there is provided an apparatus for feeding workpieces comprising a supply conveyor to which workpieces are delivered at random, a discharge conveyor arranged to receive workpieces and to move them in predetermined regular spaced relation, a turn-table conveyor located at a predetermined distance above said supply and discharge conveyors, and arranged for rotation in synchronism with the movement of the discharge conveyor, tong-like workpiece grippers disposed beneath the turn-table conveyor and equi-spaced around a pitch circle common thereto, each said tong-like gripper being arranged to be raised and lowered relative to the turn-table conveyor, a stop movable into and out of the path of a workpiece at the output end of the supply conveyor and arranged to arrest a workpiece at the output end of the supply conveyor for engagement by a tong-like gripper, and control means operable to lower a gripper and to cause it to grip a workpiece arrested by the stop and to raise the gripped workpiece for movement by the turn-table conveyor into position over the discharge conveyor, to lower the gripper and to deposit the workpiece gripped thereby on to the discharge conveyor, to release the gripper from the workpiece, and to raise the released gripper.

BRIEF DESCRIPTION OF THE DRAWINGS

FIG. 1 is a diagrammatic plan view of a workpiece feeding apparatus according to the invention, FIGS. 2 to 4 show successive steps in the removal of a workpiece from a supply conveyor path, FIGS. 5 to 7 show successive steps in the depositing of a workpiece on a discharge conveyor, FIG. 8 is an elevation of the outlet end of the supply conveyor path, FIG. 9 is a vertical section through the feeding apparatus, and FIG. 10 a vertical section of part of the feeding apparatus.

DESCRIPTION OF THE PREFERRED EMBODIMENT

Referring to the drawings, particularly to FIG. 1, T1 is a supply conveyor, which consists, for example, of two or more parallel horizontal conveyor belts 1, 101. Workpieces P, P', P'', P''' which are fed by the supply conveyor T1 one after the other at any, usually random, intervals of time or distance, the workpieces lying freely on the conveyor belts 1, 101 and being advanced thereby between lateral guide walls. The workpieces P, P', P'', P''' have already been correctly aligned on the supply conveyor T1, that is to say they have assumed predetermined positions relative one to the other. The expression "workpieces," is understood to comprise bodies of any kind which are to be subjected either to mechanical processing or to any other treatment, particularly a packing operation, or the like.

At the output end of the supply conveyor T1 there is a stop 2 which arrests the workpieces P, P', P'', P''' being conveyed. The stop 2 is secured to a curved rocking lever 4, FIG. 8, which is mounted on a pivot pin 5 below the supply conveyor T1 and by means of a rod 6 is connected to a lever arm 7. The lever arm 7 is mounted on a supporting frame for the supply conveyor T1 to rock about a pivot pin 8, and carries a cam follower roller 9 which cooperates with a rotating cam 10. A tension spring 11 attached to the lever arm 7 holds the cam follower roller 10 in engagement with the cam 10. The arrangement is such that the stop 2 is periodically temporarily deflected to the left (as viewed in FIG. 8) by the cam 10 and the lever arm 7, the rod 6, and the rocking lever 4, to the position illustrated in FIG. 3.

To retain the stop 2 in a locked workpiece arresting position thereof without stopping rotation of the cam 10 an electromagnet 12 is provided, the armature 15 of which is pivotally connected to a catch 13 to be rockable about a fixed pivot pin 14 and to cooperate with the free end 107 of the lever arm 7. In the locked position, which is shown in FIG. 8, the electromagnet 12 is energised and attracts its armature 15. The catch 13 is thus turned about the pivot pin 14, against the force of a return spring 16, so that its lower end comes into the path of movement of the lever arm 7 and thus engages as a stop with the free end 107 of the lever arm. The lever arm 7, being thus locked, consequently retains its lowermost angular position, corresponding to the workpiece arresting position of the stop 2 and cam follower roller 9 is temporarily constrained against following the cam 10. When the electromagnet 12 is deenergised, it releases the armature 15 and the return spring 16 rocks the catch 13 so that its lower end is removed out of the path of movement of the lever arm 7. The return movement of the catch 13 is limited by a stop 17, which, by a clamp 18, is fastened adjustably on the fixed pivot pin 14. The lever arm 7 can thus be rocked freely up and down by the cam disc 10 and the spring 11, so that the stop 2 can be rocked out and in accordingly.

The electromagnet 12 is controlled by a photoelectric device 3–103 (FIG. 1) which is disposed, above the supply conveyor T1, at the receiving station K for workpieces, which is disposed in front of the stop 2. The photo-electric device responds not only to the presence of a workpiece at the receiving station K, but also to the correct position or alignment of the workpieces which are to be transferred.

A horizontal discharge conveyor T2 is disposed at right angles to the supply conveyor T1, as can be seen in FIG. 1. The discharge conveyor T2 is provided with workpiece holders or drivers D, which are disposed at regular distances from one another. In addition the discharge conveyor T2 is driven continuously or intermittently in a uniform manner adapted to the work cycle of an associated processing or packing device.

The workpieces P are to be transferred from the supply conveyor T1 to the discharge conveyor T2. For this purpose a turn-table conveyor G, which is shown particularly in FIG. 9, is disposed at a predetermined distance above the two conveyors T1, T2. The conveyor G consists of a horizontal turn-table 22, which is mounted for rotation about a vertical, fixed column by a bottom bush 122 carried by bearings 20, 21. Tong-like grippers T are disposed beneath the turn-table 22, and are equi-spaced around a pitch circle common thereto.

Each gripper T consists of a vertical tubular gripper body 26, FIG. 9, which passes through an associated aperture 222 in the turn-table 22 and is mounted for longitudinal displacement in a bearing body 23 secured to the upper side of the turn-table 22. Two gripper jaws 34, 35, which are arranged to be rocked away from and towards one another, are mounted on the lower end of the gripper body 26. Each gripper jaw 34, 35 is fastened detachably and exchangeably on a pivot pin 29 or 30 respectively, the said pivot pins being mounted rotatably in the gripper body 26. A toothed segment 31, 32 is fastened on each gripper jaw 34, 35, or on each pivot pin 29, 30, so as to be adjustable, for example with the aid of a clamp. The two toothed segments 31, 32, are in meshing engagement with a double-sided rack 133 which is disposed between them and which is formed or fastened on the lower end of an operating rod 33, which passes through and is longitudinally slidable in a bore in the gripper body 26. The longitudinal displacement of the operating rod 33 in relation to the gripper body 26 effects the outward and inward rocking of the gripper jaw 34, 35, that is to say the opening and closing of the gripper T. The simultaneous longitudinal movement of the gripper body 26 and the operating rod 33 in relation to the turn-table 22 effects the raising and lowering of the pair of gripper jaws 34, 35, that is to say of the gripper T, while the closed or opened position of the gripper jaw 34, 35, which is adjusted in each case through the relative position of the operating rod in relation to the gripper body 26, is retained.

The control device for raising and lowering or opening and closing the grippers T consists of two stationary control cams 45, 46, which are disposed at a distance one above the other, coaxially with the turn-table 22, and which are mounted on a carrier 47 at the top end of the stationary column 19, which end projects beyond the turn-table 22. At the side of each gripper T there is fastened on the upper side of the turn-table 22 a bearing support 36, in which two control levers 37, 38 are pivotally mounted. Each control lever 37, 38 cooperates through a cam follower roller 43, 44 with respective control cams 45 and 46 under the influence of springs (not shown) which urge the rollers into contact with the cams. One control lever, for example the bottom lever 37, is provided at its free end with a pin 39 which engages in an annular peripheral groove 226 in the top end of the tubular gripper body 26. The upward and downward pivoting movements of the control lever 37, produced by the control cam 45 and the follower roller 43, effect the raising and lowering of the associated gripper T. The other control lever, for example the upper control lever 38, engages by means of a pin 40 provided at its free end in an annular peripheral groove of a driver 41 mounted for longitudinal sliding movement on the top end of the operating rod 33. The movement of the driver 41 in the downward direction on the operating rod 33 is limited by a stop, a for example a shoulder on the rod 33. Between the driver 41 and a head provided above it on the operating rod 33 is a compression spring 42. The upward and downward pivotal movements of the control lever 38 caused by the control cam 46 and follower roller 44 effect the closing and opening of the associated gripper T. Since on the closing of the pair of gripping jaws 34, 35 the operating rod 33 is pulled upwards, not directly, but with the interposition of the spring 42, the closing movement of the gripper T is effected partly through the action of the spring 42, that is to say the gripping jaws 34, 35 grip with limited resilient yielding a workpiece lying between them.

Each gripper body 26 is mounted in the respective bearing body 23 not only for longitudinal sliding movement but also for rotation about its longitudinal axis. A gear wheel 24 which is concentric to the gripper body 26, and through which the longitudinally slidable gripper body 26 passes, is mounted for rotation in the bearing body 23. The gear wheel 24 is rotatably attached to the gripper body 26 by splines 25, 126 and meshes with a gear wheel 27 which is mounted for free rotation on the turn-table 22 and meshes with a stationary gear 28 which is fastened to the column 19 and is coaxial with the turn-table 22. The gears wheels 24, 27, 28 form a planetary gear system which during the rotary movement of the turn-table 22 rotates the gripper bodies 26 about their longitudinal axis in relation to the turn-table 22. The planetary gear system is so designed that the grippers T or the pairs of gripping jaws 34, 35 are always held parallel to themselves during the rotation movement of the conveyor G, as can be seen in particular in FIG. 1.

The conveyor G, that is the turn-table 22, with the grippers T is driven, in synchronism with the discharge conveyor T2 and the cam 10, by for example, a gear wheel 48, FIG. 9, secured to the bush 122. The individual grippers T take a position in succession firstly over the receiving section K at the output end of the supply conveyor T1 and then, after a quarter-turn of the conveyor G, in each case over a workpiece holder D—D of the discharge conveyor T2, as illustrated particularly in FIG. 1. In the position shown in FIG. 1 by the dot-and-dash line X—X', each gripper T thus in each case takes over the first workpiece T, which is arrested by the stop 2 at the receiving section K, from the supply conveyor T1, and in the position indicated by the dot-and-dash line X—X'' deposits it in a holder D-D on the discharge conveyor T2. Since on the one hand the receiving position X—X' and the depositing position X—X'' of the grippers T correspond to the two sides of an angle of 90° in relation to the axis of rotation X (column 19) of the conveyor G, that is to say between their removal from the supply conveyor T1 and their deposition on the discharge conveyor T2 the workpieces P describe an arc of a circle X'—X'' of 90°, and since on the other hand the grippers T or the pairs of gripper jaws 34, 35 always remain parallel to themselves during their rotational movement about the axis of rotation of the conveyor G, the workpieces P are correspondingly turned 90° during their transfer from the supply conveyor P1 to the discharge conveyor T2, as can be seen particularly in FIG. 1. In the example illustrated the workpieces P are directed on the supply conveyor P1 with their longitudinal axis parallel to the direction of movement and consequently take up a position on the discharge conveyor T2 with their longitudinal axis disposed transversely to the direction of movement.

More specifically, the transfer operation takes place as follows. The stop 2 at the outlet end of the supply conveyor T1 has been rocked inwards and arrests the arriving workpieces P, P', P''. Consequently there builds up on the end portion of the supply conveyor T1 a row of successive workpieces P, P', which lie one against the other and under which the conveyor belts 101 run past, as illustrated particularly in FIG. 2. When a workpiece P lying against the stop 2 is present in the receiving station K, the photo-electric device 3, 103 keeps the electromagnet 12 of the locking device, as shown in FIG. 8 de-energised. The catch 13 is consequently withdrawn and frees the lever arm 7, which can perform a rocking movement. Each gripper T of the conveyor G enters the receiving station K at the output end of the supply conveyor T1 in the raised position and in the open condition (FIG. 2). At the receiving station K the opened gripper T is lowered onto the first workpiece P lying against the stop 2, whereupon the gripper is closed and, after it has gripped the workpiece P, is raised together with the latter, as illustrated in FIGS. 3 and 4. Simultaneously with the raising of the workpiece P, or shortly before, the stop 2 is rocked out of the path of movement of the workpiece P, which is carried by the gripper T, by means of the cam 10 and the unlocked lever linkage 7, 6, 5 (FIG. 3), and thus allows this workpiece to be taken from the supply conveyor T1 without hindrance. It must in fact be borne in mind that on the raising of the closed gripper T the latter simultaneously continues to run in the direction of rotation of the conveyor G, so that the workpiece P carried by it would strike against the stop 2 if the latter were not rocked out into its released position in good time. After the removed workpiece P has passed over it, the stop 2 is rocked back into its workpiece arresting position in which it closes the output end of the supply conveyor T1 (FIG. 4), and in which it arrests in the receiving position K the advancing row of workpieces P', P'', together with a new workpiece P'.

The raised, closed gripper T carrying the workpiece P then takes up a position above a workpiece holder D—D of the discharge conveyor T2 (FIG. 5) and is lowered again until the workpiece P lies on the discharge conveyor T2. The gripper T is then opened, releases the workpiece P (FIG. 6) and is raised again (FIG. 7).

If no workpiece is present at the receiving station K at the output end of the supply conveyor T1, the photo-electric device 3, 103 transmits a corresponding signal which by means of an electric control device (not shown) prevents the closing movement of the gripper G lowered at the receiving station K and the rocking-out of the stop 2 to its release position. For this purpose, as already described, the electromagnet 12 is energised and brings the catch 13 into engagement with the lever arm 7, consequently locking the stop 2 in its rocked-in arresting position as illustrated in FIG. 8. In order to prevent the closing movement of the gripper T in the receiving station K, another cam follower roller 50 (FIG. 9) is provided on the control lever 38, which in conjunction with the upper control cam 46 effects the displacement of the operating rod 33 and consequently the opening and closing of the gripper T. This follower roller 50 does not cooperate with the control cam 46, that is to say it is disposed at the side of the latter and coaxially to the follower roller 44 running on the control cam 46. In the region of the control cam 46 effecting the closing movement of the grippers T at the receiving station K there is provided an auxiliary control cam 51, as illustrated particularly in FIG. 10. This auxiliary control cam 51 is fastened on a rocking lever 52, which is mounted on a pivot pin 53 on a bearing support 54 fastened on the carrier 47 or on the lower control cam 45. An electromagnet 56, the armature of which is pivotally connected to a lever arm 55 of the rocking lever 52, is fastened on a bearing support 57 provided in the interior of the hollow carrier 47 of the control cams 45, 46.

Under normal operating conditions, that is to say when the photo-electric device 3, 103 detects the presence of a workpiece P at the receiving station K at the output end of the supply conveyor T1, the electromagnet 56 is de-energised and releases the rocking lever 52 together with the auxiliary control cam 51. The rocking lever 52 is then rocked inwards, to the right in FIG. 10, as far as a stop 59, by means of a tension spring 58. In this position of rest of the rocking lever 52, the auxiliary control cam 51 carried by the lever 52 lies outside the path of movement of the follower roller 50 of the control lever 38. The closing and opening movements of the associated gripper T are thus effected, in the manner described above, by the control cam 46 in conjunction with the follower roller 44.

If on the other hand the photo-electric device 3, 103 senses the absence of a workpiece at the receiving station K at the output end of the supply conveyor T1, in addition to the electromagnet 12 for locking the stop 2 in its rocked-in arresting position the electromagnet 56 is also energised. The latter attracts its armature and thus rocks the rocking lever 52, to the left in FIG. 10, against the force of the tension spring 58. In this rocked-out operative position of the rocking lever 52, which is illustrated in FIG. 10, the auxiliary control cam 51 comes to lie in the path of movement of the follower roller 50. The auxiliary control cam 51 is so constructed that it cancels the closing action applied to the gripper T by the control cam 46. After the lowering of the gripper T at the receiving station K the follower roller 44 of the associated control lever 38 runs onto the auxiliary control cam 51, which has been rocked out into its operative position, while the follower roller 44 lifts off from the control cam 46. The lowered gripper T is consequently not closed. After correct operating conditions have been restored the electromagnet 56 is de-energised and the rocking lever 52 together with the auxiliary control cam 51 is rocked inwards into its position of rest by the tension spring 58.

We claim:
1. Apparatus for feeding workpieces, comprising
   a. a supply conveyor to which workpieces are delivered at random;
   b. a discharge conveyor arranged to receive workpieces and to move them in predetermined spaced relation;
   c. a turntable conveyor located a predetermined distance above said supply and discharge conveyors;
   d. means for rotating said turntable conveyor in synchronism with the movement of the discharge conveyor;
   e. a stop movable into and out of the path of a workpiece at the output end of the supply conveyor;
   f. a plurality of tong-like workpiece grippers mounted beneath the turntable conveyor and equidistantly spaced around a pitch circle common thereto, each said tong-like gripper being arranged to be raised and lowered relatively to the turntable conveyor;

g. control means operable to lower a gripper and to cause it to grip a workpiece arrested by said stop and to raise the gripper workpiece for movement by the turntable conveyor into position over the discharge conveyor, to lower the gripper and to deposit the workpiece gripped thereby onto the discharge conveyor, to release the gripper from the workpiece, and to raise the released gripper;

h. means operable to effect rotation of a gripper relative to the turntable conveyor at least during movement of said gripper from the workpiece gripping position thereof relative to the supply conveyor to a position at which it is lowered relative to the discharge conveyor to deposit a workpiece thereon, the said means comprising a planet gear coaxial with each gripper and rotatable therewith, a stationary sun gear coaxial with the axis of rotation of the turntable conveyor, said planet gear being rotatable through the intermediary of said stationary sun gear;

i. each said gripper comprising a vertical tubular gripper body which is mounted for longitudinal sliding movement in the turntable conveyor, is operatively connected to said control means, and at its lower end has two gripper jaws pivotally mounted thereon for movement towards and away from one another; and j. an operating rod extending through said tubular gripper body for opening and closing said gripper jaws, said operating rod being slidable lengthwise of the gripper body, the lower end of the operating rod being formed as a double-sided rack which meshes with two opposite toothed segments one each of which is connected to a gripper jaw, and the upper end of the operating rod projecting out of the gripper body and being operatively connected to said control means.

2. Apparatus according to claim 1, wherein the tubular gripper body is slidable longitudinally through a planet gear mounted for rotation relative to the turntable conveyor, and is coupled to the planet gear by a splined connection for rotation with the planet gear, and wherein the planet gear is rotatable through the intermediary of a stationary sun gear co-axial with the axis of rotation of the turn-table conveyor.

3. Apparatus according to claim 1, wherein the control means comprises two control levers, one for each gripper, rockably mounted on the turn-table conveyor, each of said control levers cooperating with a fixed control cam coaxial with the turn-table conveyor, said control levers being respectively pivotally connected one to the gripper body and one to the operating rod.

4. Apparatus according to claim 3, wherein the control lever is connected with the operating rod through a driver slidable longitudinally on the operating rod and spring-urged in one direction towards an abutment on the operating rod.

5. Apparatus according to claim 1, including a stop actuating cam driven in synchronism with the discharge conveyor, and a spring-loaded lever linkage connected to the stop and operated by said stop actuating cam to rock the stop out of the path of movement of a workpiece carried by a gripper.

6. Apparatus according to claim 1, including locking means arranged to lock the stop in the workpiece arresting position thereof and to prevent closing movement of the gripper in the event of absence of a workpiece against the stop, and sensing means at the output end of the supply conveyor in front of the stop, and arranged to control said locking means.

7. Apparatus according to claim 6, wherein the locking means comprises an adjustable catch, and including an electromagnet arranged in the locking position to interpose said catch into the lever linkage to prevent operation of said linkage by said stop actuating cam.

8. Apparatus according to claim 6, wherein the means for preventing closing movement of the gripper comprises an adjustable auxiliary control cam, and including an electromagnet for controlling said auxiliary control cam and which in the operative position cooperates with the control lever for opening and closing the gripper.

* * * * *